Figure 1:
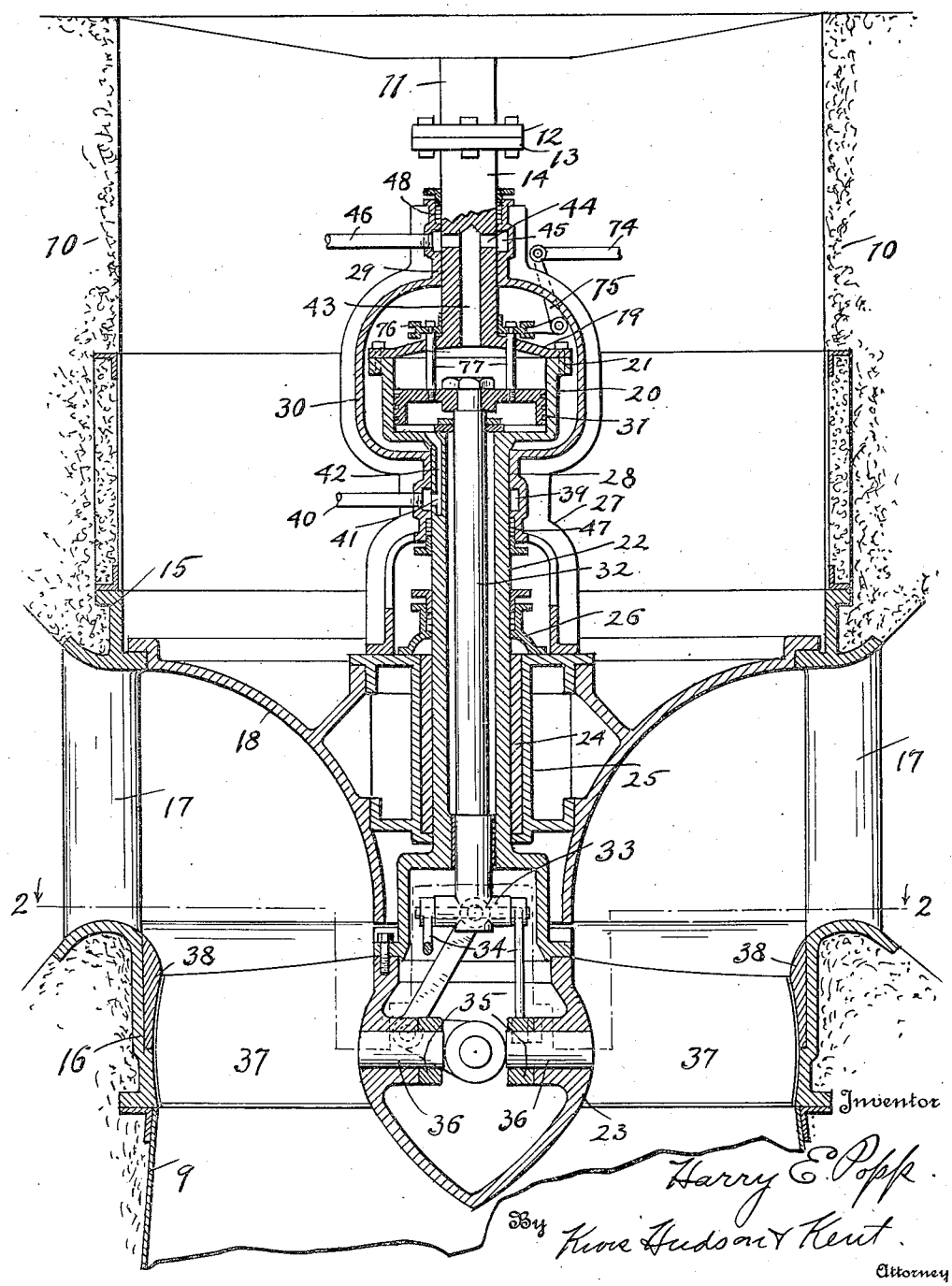

Jan. 30, 1934.　　　H. E. POPP　　　1,945,071
HYDRAULIC TURBINE
Filed Aug. 31, 1927　　　3 Sheets-Sheet 1

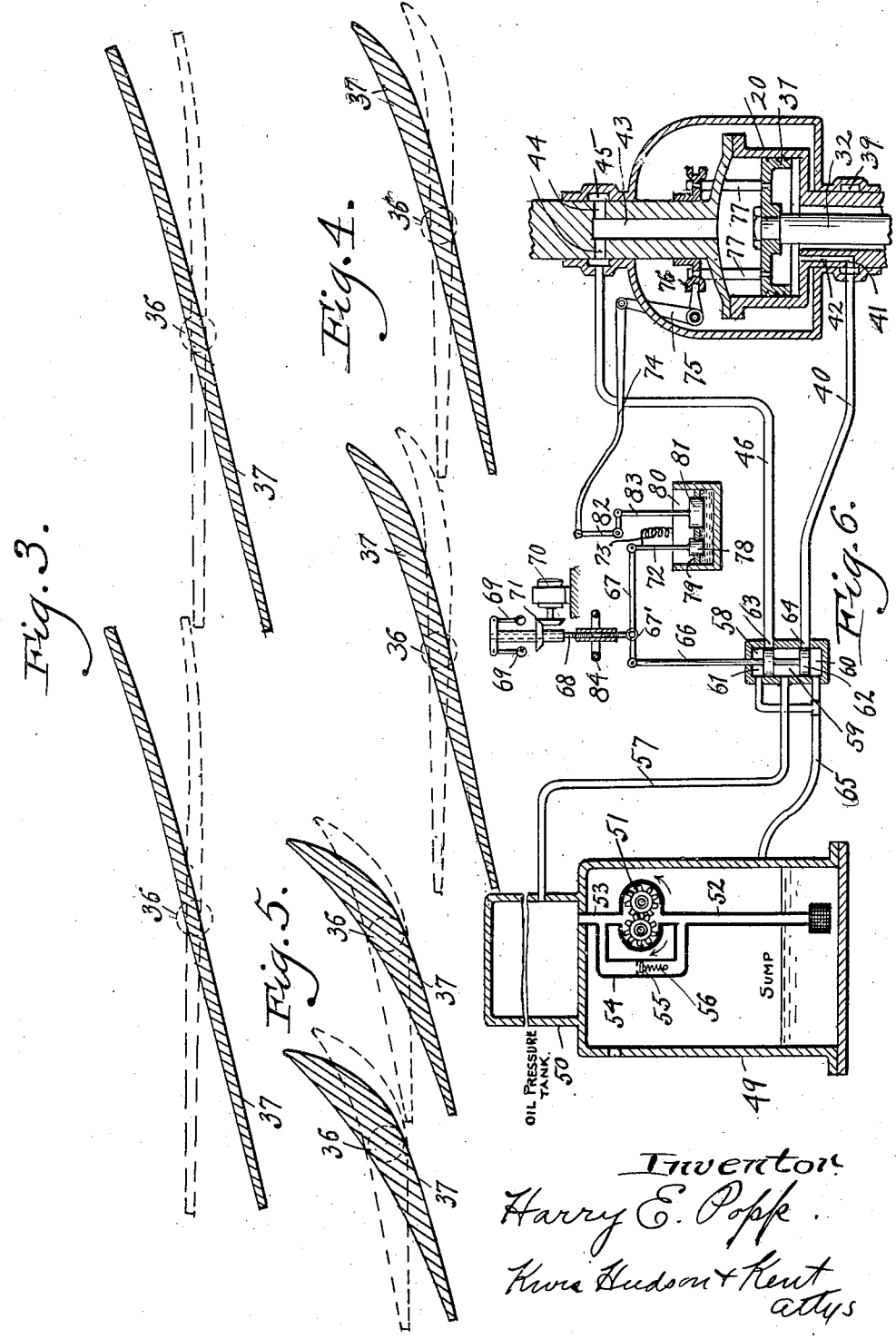

Patented Jan. 30, 1934

1,945,071

UNITED STATES PATENT OFFICE 1,945,071

HYDRAULIC TURBINE

Harry E. Popp, York, Pa.

Application August 31, 1927. Serial No. 216,514

19 Claims. (Cl. 253—148)

This invention relates to improvements in hydraulic turbines and relates particularly to means for automatically maintaining a substantially constant speed of rotation in spite of varying load conditions.

The ordinary form of high speed turbines in common use consists of an axial flow propeller-type runner (so called because of its resemblance to a ship propeller) mounted on the end of a shaft and supplied with water from the surrounding casing through an annular opening above and around the periphery of the runner. This annular space is usually spanned by fixed speed ring vanes which serve to transmit the weight of the superimposed parts down into the substructure, and by movable guide vanes whose purpose, under control of a governor, is to regulate the amount of water flowing to the runner and thus maintain constant speed under variable load conditions. These movable guide vanes are expensive and their use alone for regulation does not satisfactorily accomplish the intended purpose for the following reasons:

Assuming that the runner is designed for a load corresponding to maximum efficiency (usually 90 percent of full load), the entrance and discharge angles of the runner vanes and the openings between the vanes are determined by regard for the constant peripheral velocity of the runner and the magnitude and direction of the water velocities entering and leaving the runner. It is obvious that if the runner vanes are fixed and the angles designed for water velocities corresponding to one particular load, then at any other load with its different water velocities the fixed vane angles will not permit proper entrance and exit of the water and hydraulic losses will occur.

The effect of movable guide vanes at the entrance of the runner is to change the amount of water, and also to some extent its direction, as the load changes, but since the passage through the runner and the runner angles are left unchanged and since the peripheral velocity of the runner must remain constant, the result is impaired efficiency at loads other than that particular load for which the runner has been designed.

The method involved in this invention eliminates the use of the movable guide vanes entirely and thus simplifies and reduces the cost of the entire turbine structure. It utilizes the runner vanes themselves to regulate the flow and for a complete shut down, and in so regulating the flow it changes the entrance and discharge angles and runner openings to correspond with the changed flow conditions, so that better hydraulic efficiency over a wide range of load is possible.

One of the objects of the invention is the elimination of wicket gates or guide vanes and the operating mechanism therefor, and by this elimination of parts to simplify and reduce the cost of the turbine construction as well as to reduce the overall dimensions and thus permit of closer unit spacing and a saving in power house costs.

Another object is the provision of an automatically controlled turbine in which the number of moving parts is reduced considerably over that of the usual construction, whereby production, adjustment and maintenance costs are all decreased.

Another object is the provision of a structure having improved operating efficiency.

A further object is the provision of a construction which will permit a smaller pit diameter, thus simplifying the support of the electric generator above the pit.

Still another object is the provision of a structure which may be closed more tightly than those employed heretofore, thus reducing leakage.

Figure 2:
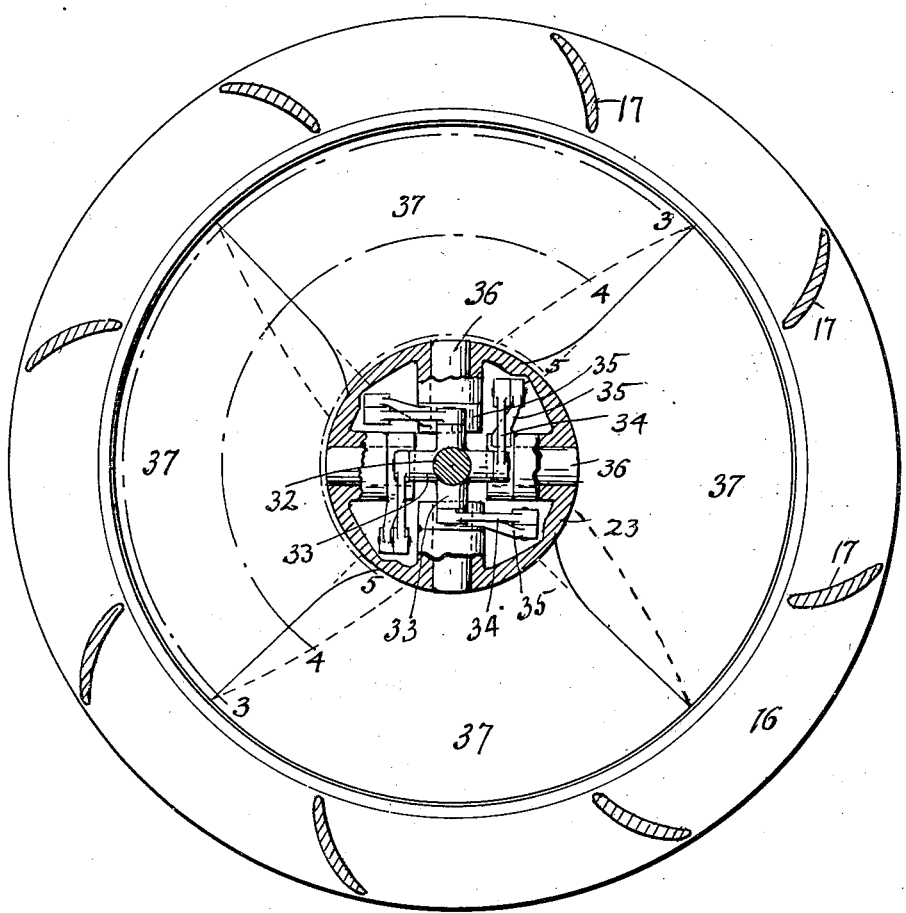

Other objects and features of novelty will appear as I proceed with the description of that embodiment of the invention which, for the purposes of the present application, I have illustrated in the accompanying drawings, in which Fig. 1 is a vertical sectional view illustrating my invention as used in a closed flume;

Fig. 2 is a horizontal sectional view taken substantially on line 2—2 Fig. 1;

Figs. 3, 4 and 5 are vertical sectional views of adjoining runner vanes, these views being taken along arcs of circles indicated by the lines 3—3, 4—4 and 5—5, respectively, of Fig. 2; and Fig. 6 is a diagrammatic view illustrating the arrangement of the parts in the control system.

In the drawings, the cylindrical wall of a pit is indicated at 10. The water as it leaves the runner is discharged through a draft tube 9. The generator to be driven by the hydraulic turbine is not shown in the drawings, but the lower end of its shaft appears in Fig. 1 at 11. On this lower end there is a flange 12 which is bolted to a flange 13 on the upper end of a shaft 14 which constitutes the upper portion of the turbine shaft. Upper and lower speed rings are represented at 15 and 16, and are joined by a series of fixed guide vanes 17 which not only direct the course of the incoming water but also act as structural members, tying the two rings 15 and 16 together. The crown plate which directs the incoming water downwardly is shown at 18, being supported at its periphery by a flange on the ring 15.

The lower end of shaft 14 merges into a cover 19 for a cylinder 20 to which it is secured by screws 21, or the like. The cylinder 20 constitutes the upper end portion of the hollow shaft 22 which, in effect, is a continuation of the shaft 14, these two shafts together forming the turbine shaft. The lower end of shaft 22 is enlarged and has suspended therefrom a hub 23 which is hollow and has an outer surface that is spherical throughout a considerable portion of its extent. Somewhat above its lower end the shaft 22 is journaled in a bearing 24, preferably of lignum vitae strips mounted in a housing 25, the latter being supported in any convenient manner upon the crown plate 18. Above the bushing 24 I mount a packing gland 26. On the housing 25 there is supported a fixed housing 27 which has portions 28 and 29 that bear closely upon the shafts 22 and 14, respectively, and an enlargement 30 which surrounds the cylinder 20 and associated parts.

Within the cylinder 20 is a piston 31 that is attached to the upper end of a piston rod 32. At its lower end this rod carries four radial arms 33 having reduced ends upon which are pivoted the upper extremities of four links 34 that are pivoted at their lower ends to four cranks 35 on the inner ends of trunnions 36, which are mounted in radial bearings in the hub 23. These trunnions are integral with the runner vanes 37, also four in number. It is not my intention to limit the invention to a construction having four vanes, as a greater or even lesser number might be employed, the number of cranks and links 35 and 34, respectively, being modified accordingly.

The inner ends of the vanes from their discharge edges to a position slightly in advance of the trunnions 36 are cut on a circle to correspond with the curvature of the spherical surface of the hub 23, just sufficient clearance being allowed to prevent undue friction when the trunnions 36 are turned.

At their outer ends the vanes 37 are curved in a circle which is concentric with the curvature of the inner ends of the vanes and which corresponds to the curvature of a surrounding spherical surface that is formed partly upon the ring 16 and partly upon a ring 38 which is removable in order to permit the removal of the vanes 37 upwardly. The usual clearance is maintained between the vanes 37 and the adjacent surfaces of the rings 16 and 38, and owing to the fact that these surfaces are spherical this clearance is maintained regardless of the adjusted positions of the vanes. Furthermore, as shown in Figs. 2 to 5, the vanes are fan-shaped and wide enough at all radial positions to touch each other when they are brought into horizontal position or approximately horizontal position, being so formed that the trailing edge of each vane may be caused to engage the next vane throughout the extent of that edge, as shown in dotted lines in Figs. 3, 4 and 5, whereby the runner is entirely closed and the flow of water entirely interrupted. The inner ends of the vanes toward their entrance edges depart from a circle, but that is of no consequence inasmuch as the discharge edges of the adjacent vanes make contact near the trunnion as shown in Fig. 5.

The means which I employ for automatically adjusting the vanes 37 by means of cranks 35, links 34 and piston rod 32 will now be described.

In the portion 28 of housing 27 there is an annular groove 39 with which connects a pipe 40. A short radial passage 41 in shaft 22 connects the groove 39 with a lengthwise passage 42 in the shaft leading to the lower end of cylinder 20. The upper end of cylinder 20 is in communication through an axial passage 43 in shaft 14 and radial passages 44 therein with an annular groove 45 in the housing portion 29, and a pipe 46 is connected with that groove. Packing 47 and 48 is employed to prevent leakage from the grooves and passages mentioned, as the liquid therein, preferably oil, is normally under pressure.

A difference in pressure upon the opposite sides of piston 31 causes that piston and its rod 32 to move and thus swing the vanes upon their trunnions 36. I provide a suitable means for putting a body of oil under pressure and for connecting one or the other of the pipes 40, 46 with such oil under pressure while the other pipe is connected with an exhaust passage, and thereby to move the piston 31. Such means can be manually operated but I prefer to have the control partially manual and partially automatic, the automatic control being dependent upon a centrifugal governor with connections of such a nature that when the load increases, tending to slow up the turbine, the governor operates a valve which takes the pressure off the underside of piston 31 simultaneously admitting pressure to the upper side, thus opening the vanes 37 slightly and permitting more water to flow through the turbine and thus meet the increased load; and a movement of the piston in the opposite direction being effected by the governor when the load is decreased. No particular detail construction of mechanisms which might be employed for bringing about these results is essential to the present invention and, therefore, I have illustrated only diagrammatically a mechanism which may be used for the purpose.

In Fig. 6 a vessel containing an oil sump is represented at 49. Above this vessel there is an oil-pressure tank 50. A gear pump 51, which may be driven from any suitable source of power, is adapted to lift oil from the sump through pipe 52 and force it into tank 50 through pipe 53. A by-pass 54 is arranged around the pump with a check valve 55 therein which is held closed until a spring 56 is overcome by the pressure in tank 50 rising above a certain predetermined point, after which the pump merely circulates oil through the by-pass 54.

From the tank 50 a pipe 57 leads to a valve which may comprise a cylindrical casing 58 with its interior divided into three chambers 59, 60 and 61 by a slidable spool valve 62. In its central position valve 62 covers and closes ports 63 and 64 in casing 58, connected respectively to pipes 46 and 40. Pipe 57 connects chamber 59 to the pressure tank 50, while pipe 65 connects chambers 60 and 61 to sump tank 49.

Movement of valve 62 is accomplished by means of stem 66 connected to one end of floating lever 67. At an intermediate point 67' stem 68 is attached to floating lever 67. Stem 68 carries at its upper end flyballs 69, so mounted that they can be revolved by motor 70 through bevel gearing 71. Motor 70 takes its current from the generator that is driven by the turbine and its rotor therefore revolves in synchronism with the generator rotor. As flyballs 69 swing outward, due to increased speed of motor 70, stem 68 is moved downward, thus moving valve 62 downward by means of lever 67 and stem 66. Similarly, valve 62 is raised as flyballs 69 swing inward due to decreased speed of motor 70. At normal generator speed valve 62 is in its central position with ports 63 and 64 covered.

The right-hand end of lever 67 is attached by means of rod 72 to plunger 78 sliding in a diaphragm 79 in dashpot 80 which is filled with liquid. Another plunger 81 also slides through diaphragm 79, obtaining its motion from bell crank 75 through rod 74, another bell crank 82 and stem 83.

A downward movement of plunger 81, displacing the liquid in the dashpot 80 below the diaphragm 79 causes plunger 78 to move up through the diaphragm 79 and thus through stem 72, floating lever 67 and stem 66, moving downward valve 62. Similarly, if plunger 81 is raised, plunger 78 is depressed. For very slow movement of plunger 81, plunger 78 does not move much because the liquid in the dashpot has time to by-pass from one side of diaphragm 79 to the other through the slight clearance between plunger 78 and diaphragm 79. For very rapid movement of plunger 81, this bypassing cannot take place rapidly enough and a considerable movement of plunger 78 takes place. Spring 73 has one end attached to rod 72 and the other to dashpot 80. It is not strong enough to resist the movement of plunger 78 due to movement of plunger 81, but always tends to restore plunger 78 to its central position in diaphragm 79. Referring again to Fig. 1, the rod 74 is there shown connected to bell crank 75 which engages in a peripheral groove in a rotating collar 76 surrounding shaft 14. This collar is slidable on the shaft and is attached to pins 77 that pass through openings in cover 19 and are anchored in piston 31. The collar 76 therefore turns with the turbine shaft but moves vertically with piston 31.

*Operation.*—Whenever the load upon the turbine is increased, the rotation of its shaft is retarded and motor 70 is retarded accordingly, whereupon the flyballs 69 move inwardly and elevate point 67' of floating lever 67. The stem 66 is thereby raised, lifting valve 62, and opening up communication between chamber 59 and port 63 and also between chamber 60 and port 64. Oil under pressure immediately flows from tank 50 through pipe 57 to the space above piston 31 through pipe 46 and passages 45, 44 and 43. At the same time the chamber below piston 31 is opened to the sump tank 47 through passages 42 and 41, pipe 40 and pipe 65. Piston 31 immediately moves downward, swinging vanes 37 on their trunnions 36 to enlarge the openings between vanes and thus increase the amount of water flowing and meet the demand for increased load.

If the load change is a large and sudden one, the movement of piston 31 responds quickly to the action of the governor, while the speed change in the turbine responds more slowly to the changed adjustment of vanes 37. Accordingly, it is desirable to check the movement of piston 31 to prevent its traveling further than is necessary in order to compensate for the changed load condition. This is done by the movement of collar 76, bell crank 75 and rod 74 which, of course, respond immediately to the movement of piston 31. As piston 31 descends, rod 74 moves to the right and, by means of bell crank 82 and rod 83, forces plunger 81 downward, displacing the liquid below diaphragm 79 and thus forcing plunger 78 upward. This movement raises stem 72 and with it the right-hand end of lever 67, thus moving downward stem 66 and with it valve 62, covering up again the ports in casing 58 and stopping further movement of piston 31. Spring 73 then slowly restores plunger 78 to its central position, which has a tendency to again raise valve 62 from its central position, but by this time the speed has returned to normal and the flyballs have swung out, thus lowering point 67' and counteracting this upward movement of valve 62. Whenever the speed is normal, either before or after a load change, valve 62 and plunger 78 are in their central positions and lever 67 is horizontal.

If the load change is a very gradual one, plunger 81 is depressed slowly and the liquid in dashpot 80 has time to by-pass from one side of diaphragm 79 to the other, so that plunger 78 is raised little if any. As piston 31 slowly reaches its correct position for the changed load condition, the flyballs attain their correct speed and restore the valve 62 to its central position.

When the load on the turbine decreases, the movement of the vanes towards closed position is accomplished by a reverse action of the control mechanism, as will be obvious.

When it is desired to stop the turbine, the operator turns handwheel 84 which engages right and left-hand threads on the two sections of stem 68. This forces point 67' downward and with it valve 62, thus connecting the chamber below piston 31 to the pressure tank and the chamber above piston 31 to the sump tank, causing the piston 31 to rise to the full extent of its travel and tightly close vanes 37, whereby the flow of water is entirely interrupted.

I claim:

1. In a hydraulic turbine, a runner comprising a hub having a spherical surface, a plurality of vanes rotatably adjustable in said hub about axes meeting in the center of said spherical surface, and an enclosing wall for the outer extremities of the vanes, said wall having a spherical surface concentric with said first named spherical surface, the inner and outer extremities of the vanes being curved to conform to circles struck from the center of said spherical surfaces.

2. In a hydraulic turbine, a runner comprising a plurality of vanes rotatably adjustable about axes meeting in a common center, the transverse dimensions of said vanes along circles concentric with the center of the runner being at least equal to the distance between the axes of adjacent vanes along such circles, an enclosing wall for the outer ends of said vanes, and means for maintaining uniform clearance between said wall and said vanes in all of the various positions of adjustment of the vanes.

3. In a hydraulic turbine, rotating parts comprising a hollow shaft, rotatably adjustable runner vanes carried by said shaft, said vanes being adapted, when in closed position, to completely close the water passage, means within said shaft for adjusting said vanes, hydraulic power means also located within the shaft for moving said adjusting means, a valve outside the shaft for controlling the operation of said hydraulic power means, means automatically actuated by speed changes in said rotating parts for operating said valves, and manual means for controlling said valve to close said vanes.

4. In a hydraulic turbine, an axial flow runner having rotatably adjustable vanes, said vanes being wide enough to completely close the water passage when the vanes are in closed position, a hollow runner shaft, a speed governor, and means within said shaft under control of said governor for reducing the opening between the runner vanes and decreasing the angle of the vanes with respect to a plane normal to the shaft as the load on the turbine is reduced, and for increasing the opening between the vanes and increasing the angle of the vanes with respect to said plane as the load on the turbine is increased.

5. In a hydraulic turbine, a runner having vanes rotatably adjustable about longitudinal axes, said vanes being adapted, when in closed position, to completely close the water passage, a hollow shaft, a cylinder rotatable with said shaft, a piston in said cylinder, connections from said piston through said shaft for rotating said vanes about said axes when said piston moves in its cylinder, means for generating motive fluid, a valve for admitting and exhausting motive fluid to and from said cylinder on either side of said piston, a governor for moving said valve from closed position to open position, means dependent upon the movement of said piston for returning said valve to closed position, and manual means for operating said valve to cause the closing of said vanes.

6. In a hydraulic turbine, a runner provided with a hub having a spherical surface, an enclosing wall having a concentric spherical surface, vanes mounted in said hub and rotatable about axes meeting in the center of said spherical surfaces, said vanes having inner and outer ends conforming to circles struck from the said center, whereby uniform clearance is maintained in all positions of adjustment, the width of each vane at any distance from the center being at least as great as the distance between the axes of adjacent vanes at such distance, whereby one edge of each vane may be brought into contact with the adjacent vane for completely shutting off water flow, and means responding to variations in load for rotating said vanes upon their axes to increase the flow for an increasing load and to decrease the flow for a decreasing load and to entirely close the vanes when the load reaches zero.

7. In a hydro-electric unit, a vertical generator shaft, a turbine shaft therebelow forming a continuation of said generator shaft, said turbine comprising a runner having adjustable vanes, said turbine shaft being hollow and comprising a cylinder, a piston movable in the cylinder and operatively connected through the hollow shaft with said vanes for the adjustment thereof, an outside source of pressure fluid connected with said cylinder on opposite sides of the piston, and means for reproducing the piston movement outside of the turbine.

8. In a hydro-electric unit, a vertical generator shaft, a turbine shaft therebelow forming a continuation of said generator shaft, said turbine comprising a runner having adjustable vanes, said turbine shaft being hollow and comprising a cylinder, a piston movable in the cylinder and operatively connected through the hollow shaft with said vanes for the adjustment thereof, a fixed housing surrounding said cylinder and extending along said shaft above and below said cylinder, pressure fluid connections to said cylinder upon each side of said piston, said connections extending through said housing, and packing between said housing and shaft beyond the top and bottom fluid connections.

9. In a hydro-electric unit, a turbine shaft adapted to be direct connected at its upper end with the lower end of a generator shaft, a runner having adjustable vanes, said turbine shaft being hollow and comprising a cylinder, a piston movable in the cylinder and operatively connected through the hollow shaft with said vanes for the adjustment thereof, a fixed housing surrounding said cylinder and terminating in upper and lower sleeves surrounding said shaft, each of said sleeves having annular passages therein, packing between said sleeves and shaft beyond said annular passages, connections between said passages and said cylinder near the upper and lower ends thereof, pressure fluid connections extending through said sleeves to said annular passages, and means for reproducing the piston movements outside of the turbine.

10. In a hydraulic turbine, a substantially axial flow runner comprising unshrouded vanes supported exclusively from the hub, said vanes being rotatably adjustable about axes extending longitudinally thereof, said turbine having inlet passages of fixed capacity, and means responding to variations in the load for rotating said vanes upon their axes to increase the flow for an increasing load, to decrease the flow for a decreasing load and to entirely close the vanes when the load reaches zero.

11. In a hydraulic turbine, a substantially axial flow runner comprising vanes rotatably adjustable about their longitudinal axes, said turbine having inlet passages of fixed capacity arranged at right angles to the axis of the runner, and means responding to variations in the load for rotating said vanes upon their axes to increase the flow for an increasing load, to decrease the flow for a decreasing load, and to entirely close the vanes when the load reaches zero.

12. In a hydraulic turbine, a runner comprising a plurality of unshrouded vanes supported exclusively from the hub, each of said vanes being rotatably adjustable as a whole about an axis extending longitudinally of the vane, said axes meeting at a common point in the runner axis, and a stationary enclosing wall having a spherical contour concentric with the meeting point of said vane axes, said vanes being so formed as to meet and close the space within said wall when one limit of adjustment is reached.

13. In a hydraulic turbine, a runner comprising a plurality of unshrouded vanes supported exclusively from the hub, each of said vanes being rotatably adjustable as a whole about an axis extending longitudinally of the vane, said axes meeting at a common point in the runner axis, and a stationary enclosing wall having a spherical contour concentric with the meeting point of said vane axes, said vanes increasing in width toward the periphery of the runner, whereby the adjustment of the vanes towards the surface of revolution of the vane axes materially decreases the flow of water through the turbine, and the limit of adjustment in the same direction stops the flow of water.

14. In a hydraulic turbine, a runner comprising a plurality of vanes rotatably adjustable about axes meeting in a common center at the main axis of the turbine, and an enclosing wall for the outer extremities of the vanes, said wall having a spherical contour struck from the intersection of said vane axes, the outer extremities of the vanes being curved to conform to circles struck from the same center, said enclosing wall being demountable to an extent sufficient to permit the withdrawal of the runner longitudinally of the runner axis.

15. In a hydraulic turbine, a runner comprising a plurality of vanes rotatably adjustable about axes meeting in a common center at the main axis of the turbine, and an enclosing wall for the outer extremities of the vanes, said wall having a spherical contour struck from the intersection of said vane axes, the outer extremities of the vanes being curved to conform to circles struck from the same center, said wall being divided along a plane at right angles to the runner axis into two parts, the removal of one of said parts being adapted to permit the removal of the runner.

16. In a hydraulic turbine, a runner comprising a hub having a spherical surface centered in the axis of the runner, a plurality of vanes rotatably adjustable in said hub about axes meeting in the center of said spherical surface, the inner extremities of said vanes being curved to conform to circles struck from the same center and an enclosing wall of spherical contour for the outer extremities of said vanes, said wall being divided along a plane at right angles to the runner axis into two parts, the removal of one of said parts being adapted to permit the removal of the runner.

17. In a hydraulic turbine, a runner comprising a plurality of vanes rotatably adjustable about axes meeting in a common center, the transverse dimensions of said vanes along circles concentric with the center of the runner being at least equal to the distance between the axes of adjacent vanes along such circles, an enclosing wall for the outer ends of said vanes, said wall having a contour conforming to a sphere struck from the intersection of said vane axes, the outer ends of the vanes being curved to conform to circles struck from the same center upon a radius slightly less than the radius of the spherical walls, and one edge of each vane being constructed to meet the next vane, whereby adjustment of the vanes to their limit in one direction closes off water flow through the turbine.

18. In a hydraulic turbine, a runner comprising a plurality of vanes adjustable about axes extending longitudinally of the respective vanes, said vanes being of a width at least as great as the distance between vane axes, and having upper surfaces which are warped to compensate for different velocities at different radial distances from the axis of the runner, the thickness of each vane varying lengthwise in such manner that the lower surface of the vane is formed to engage the rear edge of an adjacent vane throughout the length thereof when the vanes are moved to the limit of their adjustment in one direction.

19. In a hydraulic turbine, a runner comprising a plurality of vanes adjustable about axes extending longitudinally of the respective vanes, said vanes being of a width at least as great as the distance between vane axes, and having upper surfaces which are warped to compensate for different velocities at different radial distances from the axis of the runner, that part of each vane which is in advance of its axis being thicker than the part which is to the rear of its axis throughout the inner and intermediate portions of the vanes, whereby the rear edge of each vane engages the lower surface of an adjacent vane throughout the length thereof when the vanes are adjusted to the limit of their movement in the closing direction.

HARRY E. POPP.